United States Patent [19]
Ljungqvist et al.

[11] Patent Number: 5,649,040
[45] Date of Patent: Jul. 15, 1997

[54] SPLICING AGED OPTICAL FIBERS

[75] Inventors: Göran Ljungqvist, Stockholm; Magnus Johansson, Lund; Leif Stensland, Järfälla, all of Sweden

[73] Assignee: Telefonaktiebolaget LM Ericsson, Stockholm, Sweden

[21] Appl. No.: 553,540

[22] PCT Filed: Mar. 30, 1995

[86] PCT No.: PCT/SE95/00339
§ 371 Date: Jun. 21, 1996
§ 102(e) Date: Jun. 21, 1996

[87] PCT Pub. No.: WO95/27225
PCT Pub. Date: Oct. 12, 1995

[30] Foreign Application Priority Data

Mar. 30, 1994 [SE] Sweden ................... 9401077

[51] Int. Cl.$^6$ .................................. G02B 6/36
[52] U.S. Cl. ................... 385/95; 65/501; 65/433; 65/407; 385/147; 359/900
[58] Field of Search .................. 65/407, 433, 488, 65/501, 508, 507; 385/95, 96, 97, 98, 99, 147; 359/900

[56] References Cited

U.S. PATENT DOCUMENTS

| 4,045,198 | 8/1977 | Rau et al. ................... 65/33 |
| 4,304,582 | 12/1981 | Aussenegg et al. ............ 65/12 |
| 4,810,054 | 3/1989 | Shinbori et al. ............. 385/96 |
| 5,061,265 | 10/1991 | Abela et al. ................. 606/7 |
| 5,566,262 | 10/1996 | Yamane et al. .............. 385/95 |

FOREIGN PATENT DOCUMENTS

| 0357341 | 3/1990 | European Pat. Off. . |
| 4041150 | 6/1992 | Germany . |

*Primary Examiner*—John Ngo
*Attorney, Agent, or Firm*—Burns, Doane, Swecker & Mathis, L.L.P.

[57] ABSTRACT

For improving mechanical characteristics of an aged optical glass fiber, the segment is retained between clamps, e.g. in a conventional splicing machine. Then the segment is heated to a high temperature in the vicinity of the softening temperature or melt temperature of the glass material of the fiber by means of an infrared light beam from a carbon dioxide laser or by an electric arc generated between the welding electrodes. In particular, the tensile strength is increased considerably by this procedure, what allows that the heated segment can be handled and exposed to the operative steps required for splicing the fiber to another optical fiber. Then also old fibers arranged in the ground can be repaired and spliced, and it is not necessary to replace whole lengths of old fibers.

9 Claims, 1 Drawing Sheet

SPLICING AGED OPTICAL FIBERS

BACKGROUND

The present invention relates to a method and a device for splicing an aged optical silica fiber to another fiber, e.g. to a new optical fiber for repair purposes.

It is well-known that optical fibers based on silica corrodes in a humid environment. Further, substantially all optical fibers which are installed for ordinary telecommunication in national networks are exposed to moisture to a larger or smaller extent. Naturally, the surface of a silica fiber is in particular exposed to corrosion attacks. The attacks cause that the tensile strength of the fiber is reduced and that the fiber gets more brittle. The deterioration of the mechanical characteristics of fibers is a large problem when repairing e.g. a fiber which is installed below ground level and has been cut off in some digging operation. Installed, aged fiber can be so brittle that it may be difficult to handle it and it can even be impossible to splice the fiber to other fibers. Up to now, for failures such as breaks or ruptures of old fibers, it has often been necessary to replace whole fiber lengths which is naturally very costly.

It has been observed previously that the rupture and tensile strength of glass fibers and wave guides can be increased by heating the fibers or waveguides to temperatures in the vicinity of the softening temperature, see the German patent applications made available to the public DE-A1 28 17 651 for Siemens AG and DE-A1 40 41 150 for kabelmetal electro GmhH. The methods and devices disclosed are conceived to be used on ordinary fibers, before the practical use thereof.

SUMMARY

It is an object of the invention to provide a method and device by means of which an aged optical silica fiber can be given improved properties in order to splice the fiber to another optical fiber.

This object is achieved by the invention, the characteristics of which are set out in the appended claims.

For improving mechanical properties of a segment of an aged optical fiber to allow the handling thereof which is required for a splicing process, the segment is heated to a high temperature near the softening temperature or the melt temperature of the glass material in the fiber. Hereby, the corrosion attacks resulting from a moist environment can be "healed", i.e. microcracks, resulting from the moisture, are melted together by the heat.

The heating power can be provided from a light beam of a laser. The light beam is focused over a cross section of the optical fiber and this heated cross-sectional area is made to be displaced along a segment of the fiber. The light beam power and the displacement velocity are chosen so that the temperature on the surface of the fiber achieves a temperature near the melt temperature. Practically it is visible by the fact that the surface of the fiber gets a "smooth" or "shiny" appearance.

Other possibilities for the heating is e.g. heating in a gas flame, by means of a heating spiral element (resistive heat element) or by means of an electric arc of the type used for a melt-fusioning in splicing optical glass fibers.

Thus the steps for splicing an aged optical fiber to another optical fiber generally comprise that first the polymer protective sleeve on the aged fiber is removed over a segment of the fiber for exposing the surface of the fiber cladding which is supposed to be of some glass or silica material. The surface of at least a portion of the segment of the aged fiber, where the cladding is exposed, is then heated to a high temperature in the vicinity of or essentially the melt temperature of the material in the fiber cladding. In particular the temperature may be chosen to such a high value that the surface of the silica fiber melts somewhat during the heating. The fiber is cut off at a place within the segment to produce an end surface, which is then spliced as an ordinary optical fiber to another one, that is this end surface is placed adjacent to an end surface of another optical fiber and these end surfaces are coupled optically to each other, by e.g. welding the fiber ends to each other.

A device for performing the above steps for splicing an aged silica optical fiber to another optical fiber will then comprise movable retainer means for clamping a fiber at both sides of a segment of the fiber to maintain the segment in an essentially straight condition, the movable retainer means generally comprising a detachable retainer box attached to a movable slide. Further there are heating means for heating at least the surface of a short region of the segment, as seen in a longitudinal direction of the segment, in particular a region having a length corresponding to a few fiber diameters at most, to a high temperature in the vicinity of or essentially the melt temperature of the material of the silica fiber. Actuator means are arranged for moving the retainer means in a direction parallel to the longitudinal direction of the segment. Finally there are the conventional splicing means such as cutting-off means for cutting the fiber at a place within the segment to provide a heat treated end portion, and attachment means for positioning fixedly the end surface of the heat treated end portion of the segment at an end surface of another optical fiber.

DESCRIPTION OF THE DRAWINGS

The invention will now be described in more detail with reference to a not limiting embodiment and with reference to the accompanying drawing in which.

DETAILED DESCRIPTION

Figure 1:
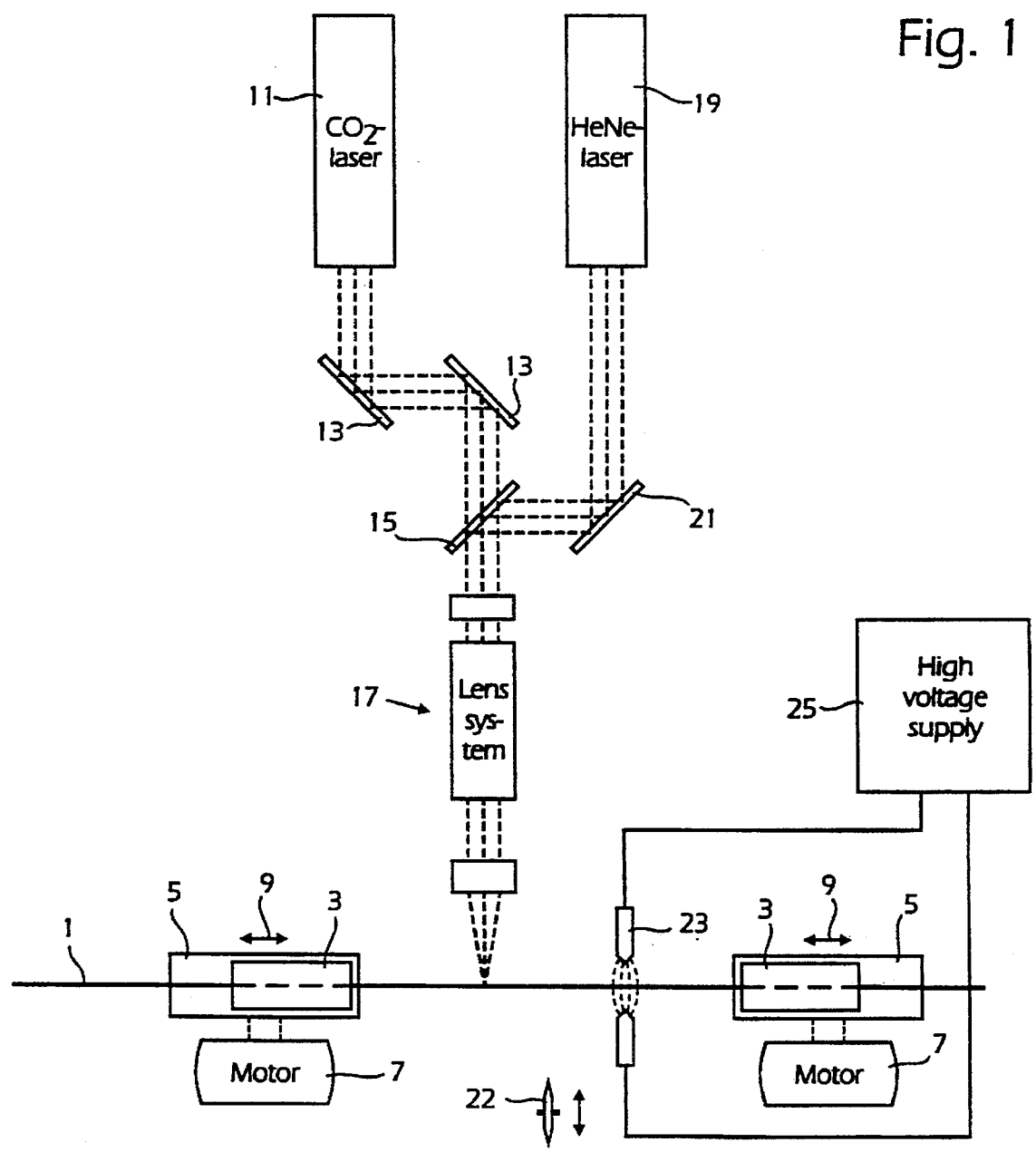
FIG. 1 schematically shows a device for restoration of mechanical properties of a fiber.

In FIG. 1 an installation is illustrated for splicing and for heat treatment of an optical aged optical fiber 1. The device is preferably a modified conventional fiber splicer unit. It thus comprises two fiber retainers 3, in which first the aged fiber is clamped extending along a straight path between the retainers. The fiber retainers 3 are attached to movable slides 5, which are actuated by drive motors 7 along suitable guides, not shown. The slides 5 can in particular move as one unit in the direction of the arrows 9 a limited distance up and back in the longitudinal direction of the clamped straight segment of the fiber 1. A carbondioxide laser 11 generates an intensive infrared light beam having a direction essentially perpendicular to the longitudinal direction of the optical fiber 1. The light beam from the $CO_2$-laser 11 is deflected by means of two parallel mirrors 13, e.g. arranged in an angle comprising 45° in relation to the light beam, so that the light beam passes along a parallel path and substantially straight through a beam mixer 15 to a lens system 17. In the lens system 17 the beam is focused to hit the fiber 1 at a point in the segment thereof which is located between the retainers 3.

Further, a helium-neon-laser 19 is arranged, providing a visible light beam having a lower intensity, which is only arranged for cooperating in directing the heat beam from the carbondioxide laser 11, so that the non-visible heat beam therefrom actually hits the fiber 1 at the intended location. The light beam from the helium neon laser 19 is deflected by an angle of 90° by means of a mirror 21 in order to be directed to the side of the beam mixer 15 and therein again be deflected by an angle of 90°. After that, for a correct adjustment, the light beam from the helium neon laser 19 has the same radiation path as the light beam or heat beam from the carbondioxide laser 11 and hits the lens system 17 and is focused to the same point on the clamped portion of the fiber 1 as the beam from the $CO_2$-laser 11.

For treating an aged silica fiber, first the protective cover thereof, ordinarily a polymer layer, is removed, e.g. chemically, over a segment of the fiber so that the surface of silica material in the cladding of the fiber 1 is exposed. Then this segment of the fiber 1, which is to be treated, is clamped between the clamps or retainers 3. The helium-neon-laser 15 is started so that it generates a beam of light having a wave length within the visible range. The lens system 17 is adjusted by a direct observation of the visible light from the helium neon laser 19, so that the focused beam (visible as a red spot) hits the fiber 1, or alternatively the slides 5 are displaced, by operating the motors 7, in directions perpendicular to the clamped fiber segment to make the focused visible light beam hit the fiber. Then the slides 5 are moved to an end position as seen in the longitudinal direction of the clamp fiber segment, the slides still moving as one unit maintaining the segment clamped along a straight line. Then also the carbondioxide laser 11 is started. The infrared ray or heat beam therefrom will then also be focused on the fiber 1 at the same location as the ray from the alignment laser 19 and will there heat the fiber strongly over a cross section thereof. The displacement of the slides 5 is started in the longitudinal direction of the clamped segment at the same time as the light beam from the carbondioxide laser hits the fiber, thus moving the segment in the longitudinal direction thereof. The movement is given a suitably adapted velocity and terminates at the other end position of the slides 5, as seen in the longitudinal direction of the fiber segment. During the movement, all of the time, the focused heat beach from the carbondioxide laser 11 thus heats a short region of the clamped fiber segment, as seen in the longitudinal direction of the fiber 1, the region being moved at a constant velocity along the fiber segment located between the fiber retainers 3.

The light or heat ray from the carbondioxide laser 11 and the movement velocity of the slides 5 and thus of the clamped fiber segment are adjusted so that the surface of the optical fiber after the heating will have a smooth, shiny appearance. The temperature, at which the surface of the optical fiber 1 is heated, can be estimated to be close to the softening temperature of the silica glass or generally near the melt temperature of the material in the silica fiber 1. The treated region of the fiber 1 will hereby get improved mechanical characteristics, in particular an improved tensile strength. In a practical experiment an aged fiber having a tensile strength comprising approximately 2 GPa obtained, by a treatment according the description above, a region having a tensile strength comprising approximately 5 GPa, i.e. the tensile strength was more than doubled within the heated segment of the fiber. Then the segment of the fiber can be mechanically handled and treated and in particular the fiber segment can be cut off at a suitable position and spliced to another optical fiber.

The cutting operation can be performed in same splicing machine if there are facilities therefor, such as cutting blade 22 movable along suitable guides, not shown, in a direction perpendicular to the clamped fiber segment. Otherwise the retainers 3 are released from the slides 5 and then one retainer is placed in a separate fiber cutter, not shown. Then this retainer with the cut and treated remaining segment of the fiber is again placed on a slide 5. A new optical fiber which has been prepared for splicing is mounted in a retainer 3 and it is placed on the other slide 5. Then the fiber ends are spliced to each other in the conventional way. Thus the slides 5 are moved independently of each other to position the fiber end surfaces essentially at each other and aligned with each other and then an electric arc is generated between two high voltage, welding electrodes 23 which are energized from a high voltage supply 25.

Instead of using the light beam from the carbondioxide laser 17 for heating the fiber segment, the heating can also be provided by the electric arc generated between the welding electrodes 23. Then also an automatic image processing and control of the movements of the slides 5, which is conventionally arranged in automatic fiber splicing machines, can be used in the heat processing of the clamped fiber segment for heating it to the desired temperature by both a control of the heating effect of the electric arc and the transport of the clamped fiber segment.

What is claimed is:

1. A method for splicing an aged silica optical fiber to another optical fiber, characterized in that a polymer protective sleeve on the aged fiber is removed over a segment at an end of the fiber for exposing the surface of the silica fiber cladding, that the surface of at least a portion of the segment of the aged fiber, where the cladding is exposed, is heated to a high temperature in the vicinity of the melt temperature of the material in the silica fiber cladding, that the fiber is cut off at a place within the segment to produce an end surface, that this end surface is placed adjacent to an end surface of another optical fiber and that these end surfaces are optically coupled to each other.

2. A method according to claim 1, characterized in that the temperature is chosen to such a high value that the silica fiber in the heating will get a smooth or shiny surface.

3. A method according to claim 1, characterized in that the temperature is chosen to such a high value that the surface of the silica fiber melts somewhat during the heating.

4. A device for splicing an aged silica optical fiber to another optical fiber, comprising:

movable retainer means for clamping a fiber at both sides of a segment of the fiber to maintain the segment in an essentially straight condition means for heating at least a surface of a short region of the segment, as seen in a longitudinal direction of the segment, in particular a region having a length corresponding to a few fiber diameters at most, to a high temperature in a vicinity of the melt temperature of the material of the silica fiber;

actuator means for moving the retainer means in a direction parallel to the longitudinal direction of the segment;

means for cutting the fiber at a place within the segment to provide a heat treated end portion of the fiber and an end surface thereof; and attachment means for connecting the end surface of the heat treated end portion of the segment to an end surface of another optical fiber.

5. A device according to claim 4, wherein the heating means further comprise a laser and a lens system for focusing a light beam from the laser.

6. A device according to claim 4, wherein the heating means further comprise welding electrodes also comprised in the splicing means.

7. A method for splicing an aged silica optical fiber to another optical fiber, comprising the steps of:

removing polymer protective sleeve on the aged fiber over a segment at an end of the fiber exposing the surface of the silica fiber cladding;

heating the surface of at least a portion of the segment of the aged fiber, where the cladding is exposed, to a high temperature in a vicinity of the melt temperature of the material in the silica fiber cladding;

cutting the fiber off at a place within the segment to produce an end surface;

placing the end surface adjacent to an end surface of another optical fiber; and coupling the end surfaces to each other.

8. A method according to claim 7, further comprising the step of choosing the temperature to such a high value that the silica fiber in the heating will get a smooth or shiny surface.

9. A method according to claim 7, further comprising the step of choosing the temperature to such a high value that the surface of the silica fiber melts somewhat during the heating.

* * * * *